United States Patent
Yoo (10) Patent No.: US 11,223,317 B2
(45) Date of Patent: Jan. 11, 2022

(54) MOTOR DRIVE SYSTEM AND METHOD CAPABLE OF SUPPRESSING HEAT GENERATION DURING LOW SPEED OPERATION

(71) Applicants: HYUNDAI MOTOR COMPANY, Seoul (KR); KIA MOTORS CORPORATION, Seoul (KR)

(72) Inventor: Tae Il Yoo, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 9 days.

(21) Appl. No.: 16/695,571

(22) Filed: Nov. 26, 2019

(65) Prior Publication Data

US 2020/0358389 A1    Nov. 12, 2020

(30) Foreign Application Priority Data

May 9, 2019   (KR) .......................... 10-2019-0054359

(51) Int. Cl.
| | |
|---|---|
| *H02P 29/68* | (2016.01) |
| *H02P 27/08* | (2006.01) |
| *H02P 23/14* | (2006.01) |
| *H02P 23/03* | (2006.01) |

(52) U.S. Cl.
CPC ............ *H02P 29/685* (2016.11); *H02P 23/03* (2013.01); *H02P 23/14* (2013.01); *H02P 27/085* (2013.01)

(58) Field of Classification Search
CPC .................................. H02P 23/03; H02P 23/14
See application file for complete search history.

(56) References Cited

U.S. PATENT DOCUMENTS

| | | | | |
|---|---|---|---|---|
| 4,088,934 | A | * | 5/1978 | D'Atre ................... H02P 27/048 318/802 |
| 4,926,105 | A | * | 5/1990 | Mischenko ............. H02P 21/06 318/800 |
| 5,038,092 | A | * | 8/1991 | Asano ............... H02M 7/53875 318/811 |
| 9,724,997 | B2 | * | 8/2017 | Luedtke .................. H02P 21/14 |

(Continued)

FOREIGN PATENT DOCUMENTS

| | | |
|---|---|---|
| KR | 10-2010-0113241 A | 10/2010 |
| KR | 10-2018-0080771 | 7/2018 |

*Primary Examiner* — Said Bouziane
(74) *Attorney, Agent, or Firm* — Lempia Summerfield Katz LLC (57) ABSTRACT

A motor drive system capable of suppressing heat generation during a low speed operation may include: an inverter including a plurality of switching elements to convert direct current power to alternating current power having a plurality of phases; a motor driven with the alternating current power converted in the inverter; and a controller determines an operating point of the motor on the basis of a torque command of the motor and generates a d-axis current command and a q-axis current command corresponding to the operating point. In particular, when each of the switching elements is overheated, the controller changes the d-axis current command and the q-axis current command by changing the operating point to a different operating point corresponding to a torque of the same magnitude as the torque command.

11 Claims, 10 Drawing Sheets

(56) References Cited

U.S. PATENT DOCUMENTS

| | | | |
|---|---|---|---|
| 2010/0072925 A1* | 3/2010 | Itoh | B60W 20/10 318/400.02 |
| 2014/0306638 A1* | 10/2014 | Wu | H02P 21/20 318/504 |
| 2015/0054432 A1* | 2/2015 | Omata | H02P 21/14 318/400.02 |
| 2017/0302205 A1* | 10/2017 | Goetting | H02P 29/66 |
| 2019/0229665 A1* | 7/2019 | Kobayashi | H02P 29/60 |
| 2020/0114900 A1* | 4/2020 | Lee | B60K 6/48 |
| 2020/0119676 A1* | 4/2020 | Ballal | H02P 21/20 |
| 2020/0313586 A1* | 10/2020 | Gopalakrishnan | H02P 21/141 |

* cited by examiner

MOTOR DRIVE SYSTEM AND METHOD CAPABLE OF SUPPRESSING HEAT GENERATION DURING LOW SPEED OPERATION

CROSS REFERENCE TO RELATED APPLICATION

This application claims priority to and the benefit of Korean Patent Application No. 10-2019-0054359, filed on May 9, 2019, the entire contents of which are incorporated herein by reference.

FIELD

The present disclosure generally relates to motor drive system and method capable of suppressing heat generation during a low speed operation to inhibit damage due to overheating.

BACKGROUND

The statements in this section merely provide background information related to the present disclosure and may not constitute prior art.

Generally, eco-friendly vehicles such as electric vehicles, hybrid vehicles, plug-in hybrid vehicles and hydrogen battery vehicles are vehicles powered by electric power motors. In particular, in vehicles such as electric vehicles and the hydrogen battery vehicles that use a drive motor as a main power source, only a reduction gear is often employed in place of a multi-stage transmission, and a torque converter is mostly omitted in order to increase torque transmission efficiency. As for such a vehicle, the speed of the drive motor and the speed of the vehicle are synchronized at a predetermined reduction ratio. Accordingly, when the speed of the vehicle is at a low speed close to zero '0', the speed of the motor is also close to zero '0'. In this state, a maximum driving force (torque) is desired to be generated. When a driving torque is generated in a state in which a rotational speed of the motor is '0', DC current is desired to flow in a motor winding coil even in the case of an alternating current motor and the DC current is desired to flow even in a power semiconductor device of an inverter, which supplies current to the motor.

We have discovered that when the DC current flows in the power semiconductor device of the inverter and the motor, the conduction loss of the power semiconductor device and the resistance loss of the motor winding coil are concentrated in a specific phase and thus heat is generated and sufficient cooling is not performed. Accordingly, when excessive heat is generated and temperature rises above a maximum temperature limit, the power semiconductor and the motor coil may be damaged by the overheating.

We have also found that a method of limiting a magnitude of current to prevent the power semiconductor device of the inverter or the motor coil from being damaged due to the overheating has causes a problem of decreasing an output torque of the motor instead of preventing the damage, thereby significantly lowering a vehicle performance, particularly, a slope climbing performance of a vehicle.

The foregoing is intended merely to aid in the understanding of the background of the present disclosure, and is not intended to mean that the present disclosure falls within the purview of the related art that is already known to those skilled in the art.

SUMMARY

The present disclosure provides a motor drive system and a method capable of suppressing heat generation during a low speed operation. In particular, when torque is generated in a low speed state in which a rotational speed of the motor is close to '0', current can be inhibited or prevented from concentrating in one specific phase, so that an inverter or a motor can be inhibited or prevented from being damaged due to temperature rise In one aspect of the present disclosure, a motor drive system, which is capable of suppressing heat generation during a low speed operation, may include: an inverter including a plurality of switching elements to convert direct current power to alternating current power having a plurality of phases; a motor driven with the alternating current power converted in the inverter; and a controller configured to determine an operating point of the motor on the basis of a torque command of the motor and generates a d-axis current command and a q-axis current command corresponding to the operating point. In particular, when a switching element of the plurality of switching elements is overheated, the controller changes the d-axis current command and the q-axis current command by changing the operating point to a different operating point corresponding to a torque of the same magnitude as the torque command.

In the embodiment of the present disclosure, the controller may change a phase angle of the d-axis current command and the q-axis current command when the switching element is overheated.

In the embodiment of the present disclosure, when the switching element is overheated, the controller may change the operating point to a point at which an equal torque line of an operating point at which the d-axis current command and the q-axis current command are determined and an equal magnetic flux line other than an equal magnetic flux line of the operating point at which the d-axis current command and the q-axis current command are determined intersect with each other.

In the embodiment of the present disclosure, when the switching element is overheated, the controller may convert three phase currents according to the d-axis current command and the q-axis current command by using the following Equations:

$$\rho = \theta + 270 - \beta_x,$$
$$I_U = Im_x \cdot \sin\rho,$$
$$I_V = Im_x \cdot \sin\left(\rho + \frac{2}{3}\pi\right), \text{ and}$$
$$I_W = Im_x \cdot \sin\left(\rho - \frac{2}{3}\pi\right),$$

where, $Im_x$ is a peak value of each of the three phase currents, and $\beta_x$ is a phase angle of the d-axis current command and the q-axis current command, In addition, the controller may change the operating point of the motor by searching for the phase angle of the d-axis current command and the q-axis current command so as to change an angle section to which a variable $\rho$ belongs in a plurality of angle sections divided at preset intervals.

In one form of the present disclosure, a switching element to which the square of the three phase currents is maximally applied may be designated in the plurality of angle sections, and the controller may change the angle section to which the variable ρ belongs to an adjacent angle section in which the switching element to which the maximum square of the three phase currents is applied is changeable.

In another form of the present disclosure, the controller may calculate the phase angle of the d-axis current command and the q-axis current command so as to change the angle section to which the variable ρ belongs to the adjacent angle section in which the switching element to which the maximum square of the three phase currents is applied is changeable, and change the operating point of the motor to a point at which an equal torque line of the operating point at which the d-axis current command and the q-axis current command are determined by selecting an equal magnetic flux line corresponding to the phase angle and the selected equal magnetic flux line intersect with each other.

In another form, the controller may calculate the phase angle of the d-axis current command and the q-axis current command so as to change the angle section to which the variable ρ belongs to the adjacent angle section in which the switching element to which the maximum square of the three phase currents is applied is changeable, and the controller may alternately apply an operating point of the motor corresponding to a point at which an equal torque line of an operating point at which the d-axis current command and the q-axis current command are determined by selecting an equal magnetic flux line corresponding to the phase angle and the selected equal magnetic flux line intersect with each other and a prior operating point of the motor to the operating point of the motor.

In other form, the controller may calculate the phase angle of the d-axis current command and the q-axis current command so as to change the angle section to which the variable ρ belongs to a border between the adjacent angle section in which the switching element to which the maximum square of the three phase currents is applied is changeable and the angle section to which the present variable ρ belongs, and the controller may change the operating point of the motor to a point at which an equal torque line of the operating point at which the d-axis current command and the q-axis current command are determined by selecting an equal magnetic flux line corresponding to the phase angle and the selected equal magnetic flux line intersect with each other.

According to another form of the present disclosure, a motor drive method using the motor drive system capable of suppressing heat generation during a low speed operation may include: determining, by the controller, whether the switching element is overheated; and changing, by the controller, the d-axis current command and the q-axis current command by changing the operating point to a different operating point corresponding to a torque of the same magnitude as the torque command when it is determined that the switching element is overheated.

In determining whether the switching element is overheated, the controller may compare a sensed temperature value of the switching element with a preset reference value and determine that the switching element is overheated when the sensed temperature value is larger than the preset reference value.

The changing of the d-axis current and the q-axis current may include: converting three phase currents according to the d-axis current command and the q-axis current command by using the following Equations:

$$\rho = \theta + 270 - \beta_x,$$
$$I_U = Im_x \cdot \sin\rho,$$
$$I_V = Im_x \cdot \sin\left(\rho + \frac{2}{3}\pi\right), \text{ and}$$
$$I_W = Im_x \cdot \sin\left(\rho - \frac{2}{3}\pi\right),$$

where, $Im_x$ is a peak value of the three-phase current, and $\beta_x$ is a phase angle of the d-axis current command and the q-axis current command. In addition, the changing step also include: checking an angle to which a variable ρ belongs in a plurality of angle sections divided at preset intervals; and changing the operating point of the motor by searching a phase angle of the d-axis current command and the q-axis current command for changing an angle section to which the variable ρ belongs.

In the embodiment of the present disclosure, a switching element to which a square of the three phase currents is maximally applied may be designated in the plurality of angle sections, and in changing the operating point, the angle section to which the variable ρ belongs may be changed to the adjacent angle section in which the switching element to which a maximum square of the three phase currents is applied is changeable.

In the embodiment of the present disclosure, the changing of the operating point may include: calculating the phase angle of the d-axis current command and the q-axis current command so as to change the angle section to which the variable ρ belongs to the adjacent angle section in which the switching element to which the maximum square of the three phase currents is applied is changeable; and changing the operating point of the motor to a point at which an equal torque line of the operating point at which the d-axis current command and the q-axis current command are determined by selecting an equal magnetic flux line corresponding to the phase angle calculated in the calculating and the selected equal magnetic flux line intersect with each other.

In the embodiment of the present disclosure, the changing of the operating point may include: calculating the phase angle of the d-axis current command and the q-axis current command so as to change the angle section to which the variable ρ belongs to the adjacent angle section in which the switching element to which the maximum square of the three phase currents is applied is changeable; and alternately applying an operating point of the motor corresponding to a point at which an equal torque line of the operating point at which the d-axis current command and the q-axis current command are determined by selecting an equal magnetic flux line corresponding to the phase angle calculated in the calculating and the selected equal magnetic flux line intersect with each other and a prior operating point of the motor to the operating point of the motor.

In the embodiment of the present disclosure, the changing of the operating point may include: calculating the phase angle of the d-axis current command and the q-axis current command so as to change the angle section to which the variable ρ belongs to a border between the adjacent angle section in which the switching element to which the maximum square of the three phase currents is applied is changeable and an angle section to which a present variable ρ belongs; and changing an operating point of the motor to a point at which an equal torque line of the operating point at which the d-axis current command and the q-axis current command are determined by selecting an equal magnetic flux line corresponding to the phase angle calculated in the calculating and the selected equal magnetic flux line intersect with each other.

According to the motor drive system and method capable of suppressing heat generation during a low speed operation, during low speed driving of an electric motor driven vehicle, temperature of the switching elements can be inhibited or prevented from sharply rising by current being concentrated on a specific switching element of the inverter, whereby damage of the switching elements and a motor coil which may be caused by being overheated can be prevented.

Effects which can be obtained by the present disclosure are not limited to the above-mentioned effects, and other effects not mentioned will be clearly understood by those skilled in the art from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, motor drive system and method capable of suppressing heat generation during a low speed operation according to various embodiments of the present disclosure will be described in detail with reference to the accompanying drawings.

Figure 1:
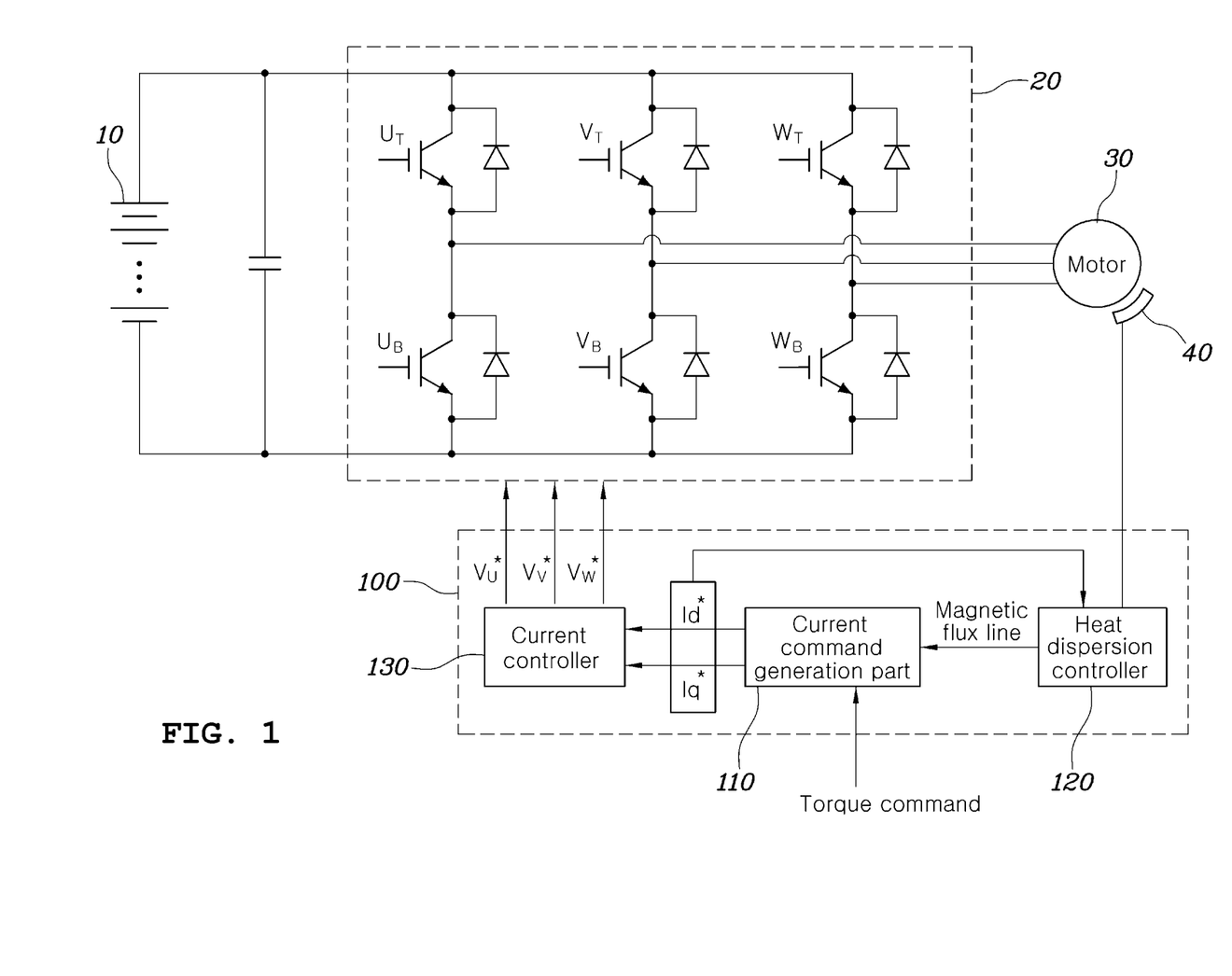
FIG. 1 is a block diagram illustrating a motor drive system capable of suppressing heat generation during a low speed operation according to an embodiment of the present disclosure.

FIG. 1 is a block diagram illustrating a motor drive system capable of suppressing heat generation during a low speed operation according to an embodiment of the present disclosure;

Generally, the system for driving a motor 30 may include a battery 10, which is an energy storage device storing electric power for driving the motor 30, and an inverter 20 converting DC power stored in the battery 10 to a three-phase AC and supplying the three-phase AC to the motor 30. The inverter 20 has three legs connected at opposite ends of the battery 10 in a parallel relation to each other, and In each of the legs, two switching elements ($U_T$, $U_B/V_T$, $V_B/W_T$, $W_B$) are connected in series to each other, and in a connection node of the two switching elements ($U_T$, $U_B/V_T$, $V_B/W_T$, $W_B$), a single-phase drive power is provided to the motor 30. To drive such a motor, a pulse width modulation control of switching elements S1 to S6 in the inverter 20 can be performed so that current can be supplied to the motor 30 by a current command corresponding to a torque of the motor 30 intended to be obtained by driving the motor 30.

A controller 100 receives rotor position information detected by a rotor position sensor 40 detecting a position of the rotor of the motor 30, a torque command, and magnetic flux information provided by a superior controller or sensor of an outside, and accordingly, a current command (Id*, Iq*) allowing heat generation to be suppressed is generated, and the inverter 20 generates a voltage command ($V_U^*$, $V_V^*$, $V_W^*$) of each phase of the motor 30 so as to output current corresponding to the generated current command (Id*, Iq*) and controls on and off states of the switching elements ($U_T$, $U_B/V_T$, $V_B/W_T$, $W_B$) in the inverter 20.

In the various embodiments of the present disclosure, the controller 100 performs a heat dispersion control to inhibit or prevent excessive heat from being generated by a DC current being concentrated in a specific phase during a low speed operation of the motor 30. To this end, the controller 100 includes a current command generation part 110 generating the current command on the basis of the input torque command and a magnetic flux, and a heat dispersion controller 120 calculating magnetic flux variation so as to generate a current command having a different phase angle while outputting the same torque as the generated current command.

The heat dispersion controller 120 performs a control of changing an operating point of the motor 30 to a position having a different phase angle on dq coordinates while outputting the same torque as the input torque command, whereby currents concentrated in a specific phase are dispersed, so that a heat dispersion effect can be achieved. The operation of the heat dispersion controller 120 will be more clearly understood by the following description.

Normally, a maximum torque per ampere (MTPA) method is mainly used to control the motor 30 operated by AC power.

Figure 2:
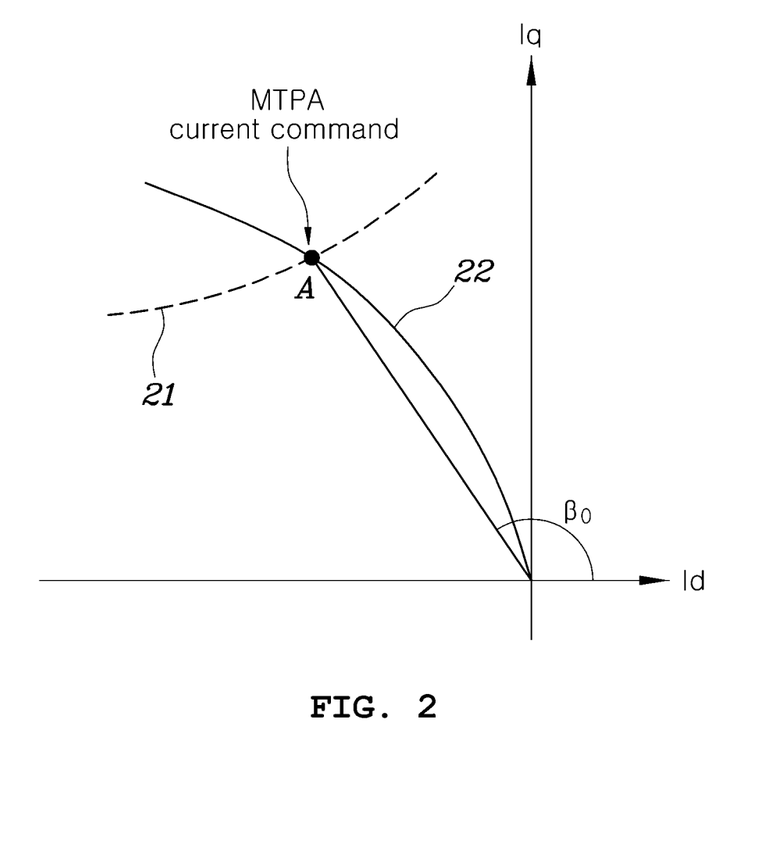
FIG. 2 is a graph illustrating a normal motor control technique of an MTPA method.

FIG. 2 is a graph illustrating a normal motor control technique of the MTPA method.

Referring to FIG. 2, the motor control technique of the MTPA method is a method of controlling a motor by determining a current command by using a point A, as an operating point, at which an equal torque line 21 indicating the same torque according to d-axis current and q-axis current of the motor and an MTPA line 22 meet. The equal torque line 21 can be determined by the torque command input from the outside, and the MTPA line 22 is a line preset in consideration of a characteristic of the motor.

Figure 3:
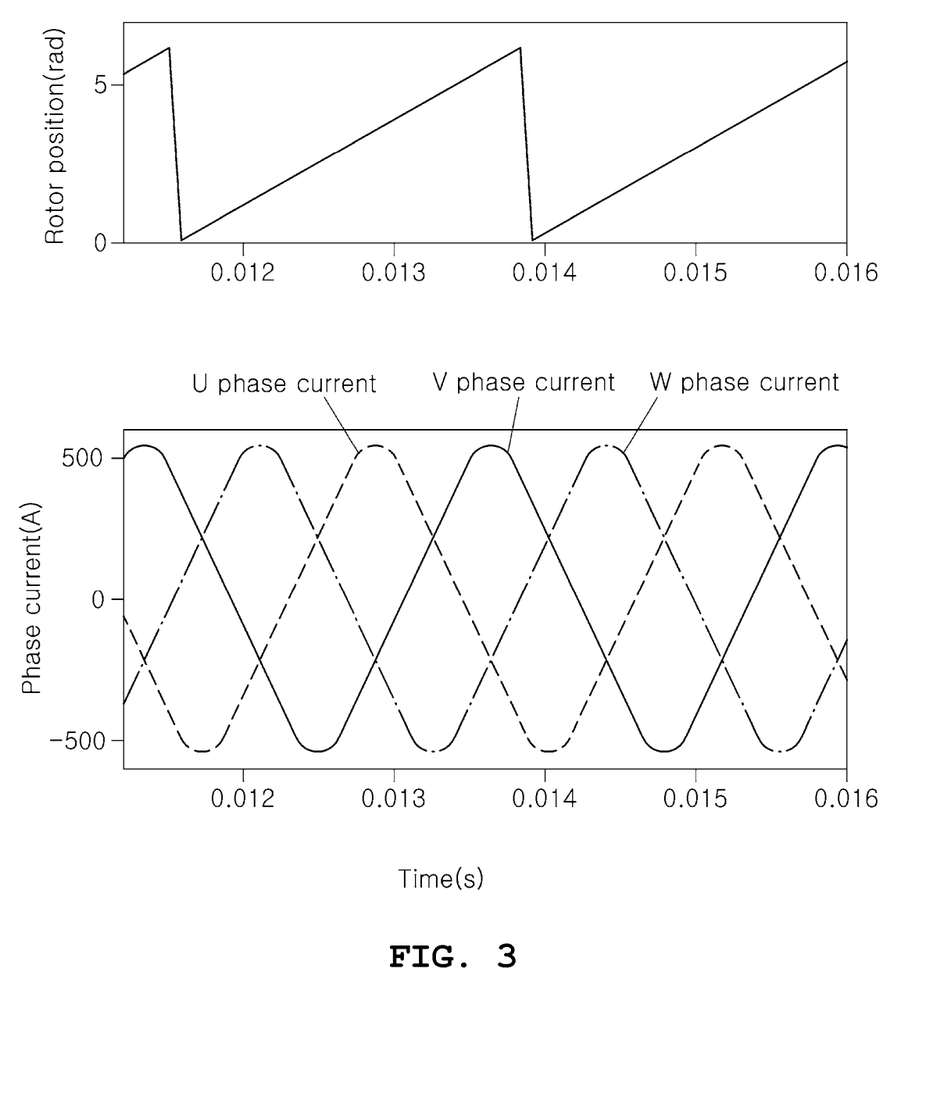
FIG. 3 is a graph illustrating a rotor position of a normal motor and a three phase currents of the motor according to the rotor position.

FIG. 3 is a graph illustrating a rotor position of a normal motor and three phase currents of the motor according to the rotor position.

As illustrated in an upper part of FIG. 3, when the rotor position of the motor 30 changes, each phase current (three phase currents) of the motor 30 is regularly changed as illustrated in a lower part of FIG. 3. When the peak value of each of the three phase currents is referred to as $Im_0$, $\theta$ is referred to as the rotor position (phase difference between a rotor and a stator), and $\beta_0$ is referred to as a phase angle of the current command on the dq coordinates. Each phase current can be determined by the following Equation 1.

$$I_U = Im_0 \cdot \sin(\theta + 270 - \beta_0)$$ [Equation 1]
$$I_V = Im_0 \cdot \sin\left(\theta + 270 - \beta_0 + \frac{2}{3}\pi\right)$$
$$I_W = Im_0 \cdot \sin\left(\theta + 270 - \beta_0 - \frac{2}{3}\pi\right)$$

In the motor drive system using the current control of the MTPA method on the dq coordinates, to output the same torque although the rotor position $\theta$ is changed by a motor rotating, a current phase angle $\beta$ is maintained to be constant by maintaining the current command on the MTPA line. However, since although magnitude of d-q current and the phase angle $\beta$ are constant, the rotor position $\theta$ of the motor changes as time passes, and thus the magnitude of the three phase currents is also changed as time passes.

When the rotor of the motor does not rotate and thus the rotor position $\theta$ of the motor does not change (when rotational speed is actually '0'), the magnitude of the three phase currents does not change and maintains a predetermined value, and accordingly is in a state in which a DC current flows. In this case, components of a phase through which maximum current of the three phase currents flows generate much heat due to a relatively concentrated current, and when proper cooling is not performed, temperature thereof sharply rises, whereby the components may be damaged.

Figure 4:
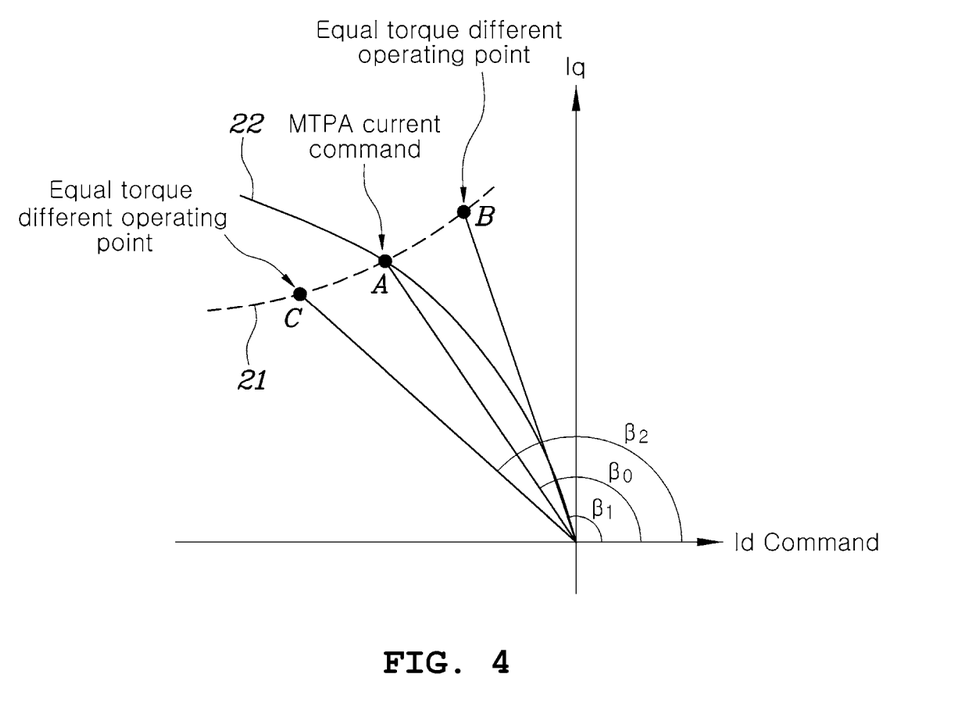
FIG. 4 is a graph illustrating operating points having different current phase angles on an equal torque line.

FIG. 4 is a graph illustrating operating points having different current phase angles on the equal torque line.

In a state in which currents are concentrated in a specific phase as described above, as illustrated in FIG. 4, when a current command is changed to an operating point having a different phase angle while the current command is positioned on the equal torque line 21 of the current command on the MTPA line, magnitude of each of currents flowing through three phases can be changed, so that heat can be dispersed.

Three phase currents of an operating point corresponding to 'B' of FIG. 3 are obtained by the following Equation 2, and three phase currents of an operating point corresponding to 'C' of FIG. 3 are obtained by the following Equation 3.

$$I_U = Im_1 \cdot \sin(\theta + 270 - \beta_1)$$ [Equation 2]
$$I_V = Im_1 \cdot \sin\left(\theta + 270 - \beta_1 + \frac{2}{3}\pi\right)$$
$$I_W = Im_1 \cdot \sin\left(\theta + 270 - \beta_1 - \frac{2}{3}\pi\right)$$

$$I_U = Im_2 \cdot \sin(\theta + 270 - \beta_2)$$ [Equation 3]
$$I_V = Im_2 \cdot \sin\left(\theta + 270 - \beta_2 + \frac{2}{3}\pi\right)$$
$$I_W = Im_2 \cdot \sin\left(\theta + 270 - \beta_2 - \frac{2}{3}\pi\right)$$

In the various forms of the present disclosure, as described above, the heat dispersion controller 120 changes the three phase currents by changing the phase angle of the current command to a position at which the operating point of the motor 30 indicates the same torque as the motor on the dq coordinates, thereby preventing the currents from being concentrated in one phase.

Figure 5:
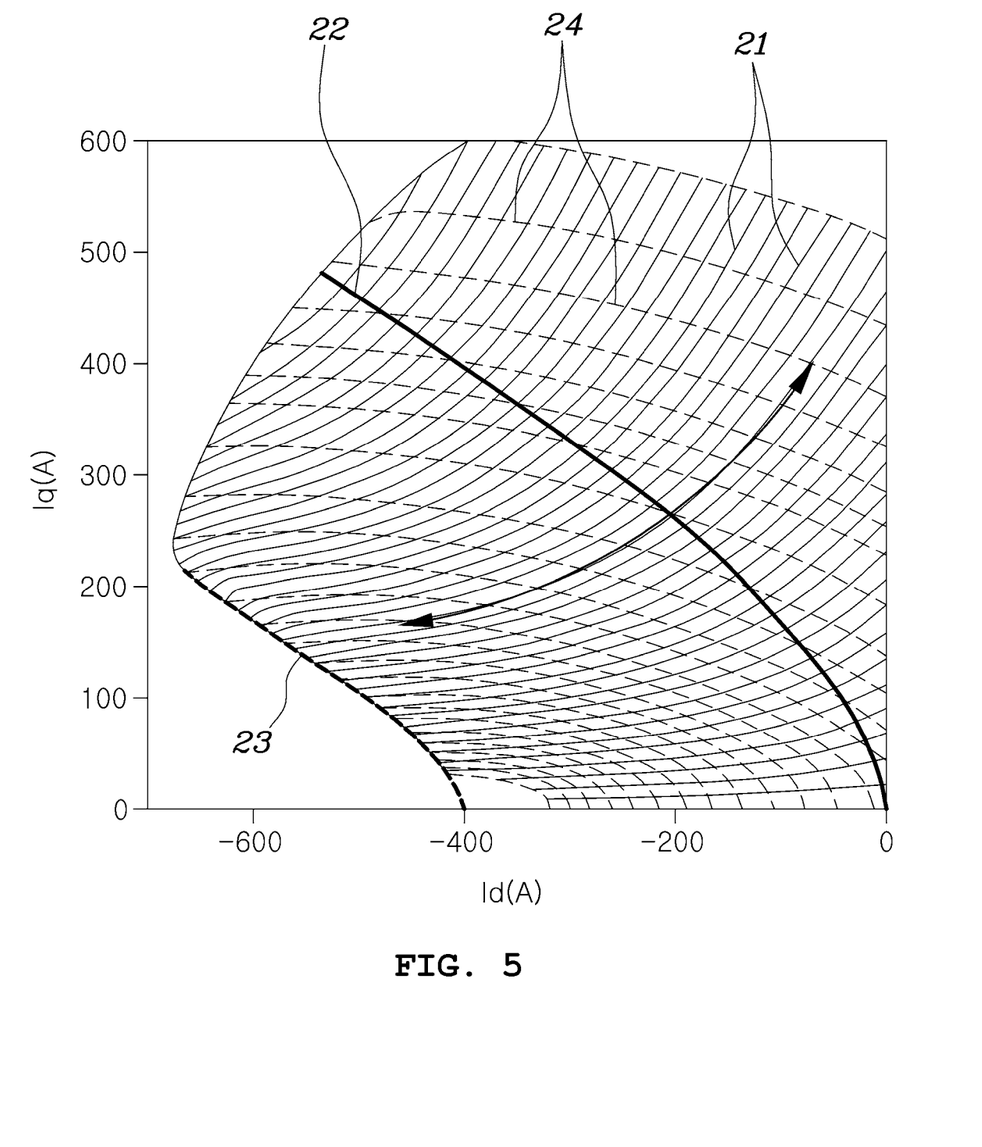
FIG. 5 is a graph illustrating an example of a current command map having a current command generation part of the motor drive system capable of suppressing heat generation during a low speed operation according to the embodiment of the present disclosure.

Meanwhile, the current command generation part 110 determines the current command by searching for a position at which the MTPA line on the basis of the input torque command and the equal torque line corresponding to the torque command meet. The current command generation part 110 includes an equal torque line, an MTPA line, and a minimum torque per voltage (MTPV) line on the dq coordinates, an example of which is shown in FIG. 5. FIG. 5 is a graph illustrating an example of a current command map constituting the current command generation part of the motor drive system capable of suppressing heat generation during a low speed operation according to the embodiment of the present disclosure.

Generally, the current command map is embodied to include equal torque lines between the MTPA line 22 and the MTPV line 23. However, in the various embodiments of the present disclosure, since a current command having a phase angle smaller than a current command determined by the MTPA line is also desired to be generated, an extended form of the current command map in which the equal torque line appears even in a section corresponding to a right side of the MTPA line 22 may be applied.

Figure 6:
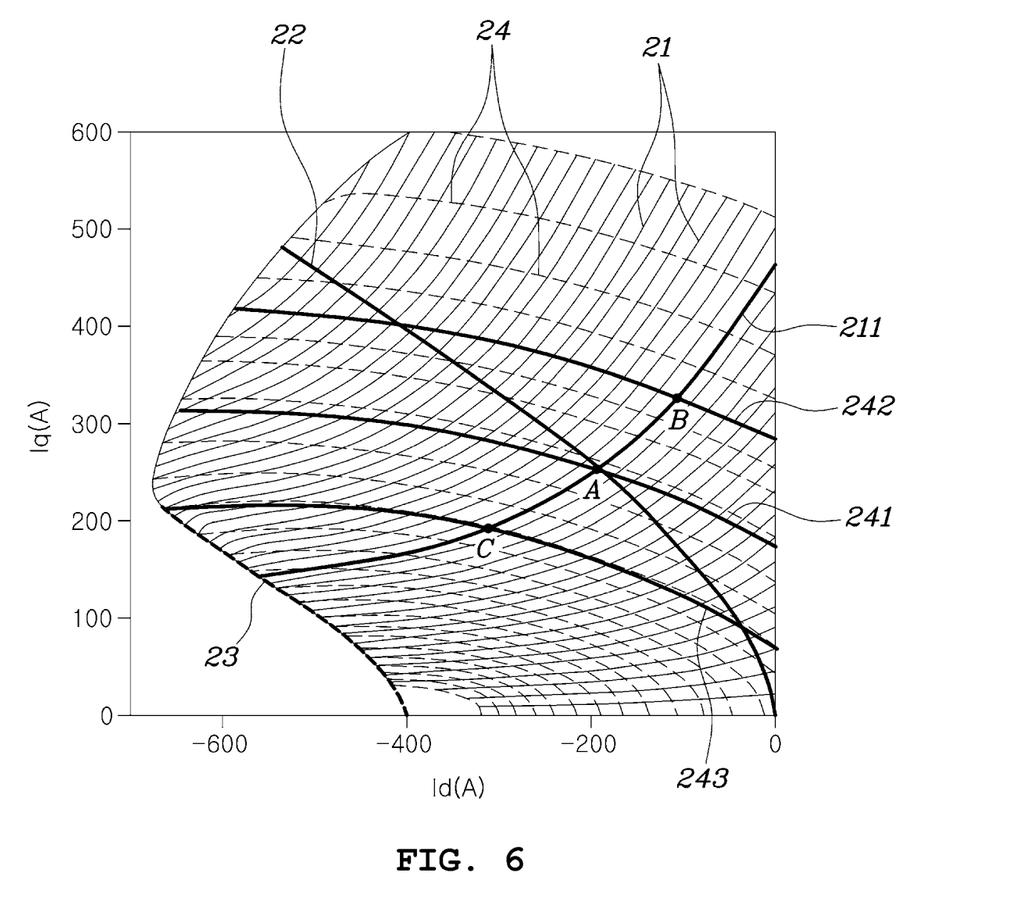
FIG. 6 is a graph illustrating a technique of determining the current command for changing the operating points of the motor by using the current command map illustrated in FIG. 5.

FIG. 6 is a graph illustrating a technique of determining the current command for changing an operating point of the motor by using the current command map illustrated in FIG. 5.

The current command map may include equal torque lines and equal magnetic flux lines. In FIGS. 5 and 6, each of the equal magnetic flux lines is referred to as a reference numeral '24'.

Referring to FIG. 6, the heat dispersion controller 120 of the controller 100 may use the equal magnetic flux line 24 to find an operating point at which the phase angle is larger or smaller than the current command corresponding to the operating point of the motor determined by the MTPA line 22. That is, when the equal magnetic flux line 242 corresponding to a magnetic flux larger than the equal magnetic flux line 241 having an intersection point with the MTPA line 22 or the equal magnetic flux line 243 corresponding to a magnetic flux smaller than the equal magnetic flux line 241 is selected among many equal magnetic flux lines having intersection points with the equal torque line 211 crossing a point A corresponding to the current command determined by the torque command input from the outside, that is, an operating point A of the motor determined by the MTPA line 22, and when an intersection point B or C of the selected equal magnetic flux line and the equal torque line is determined as an operating point of the motor, the current command having the phase angle $\beta$ smaller or larger than the current command determined by the MTPA line 22 can be determined.

Figure 7:
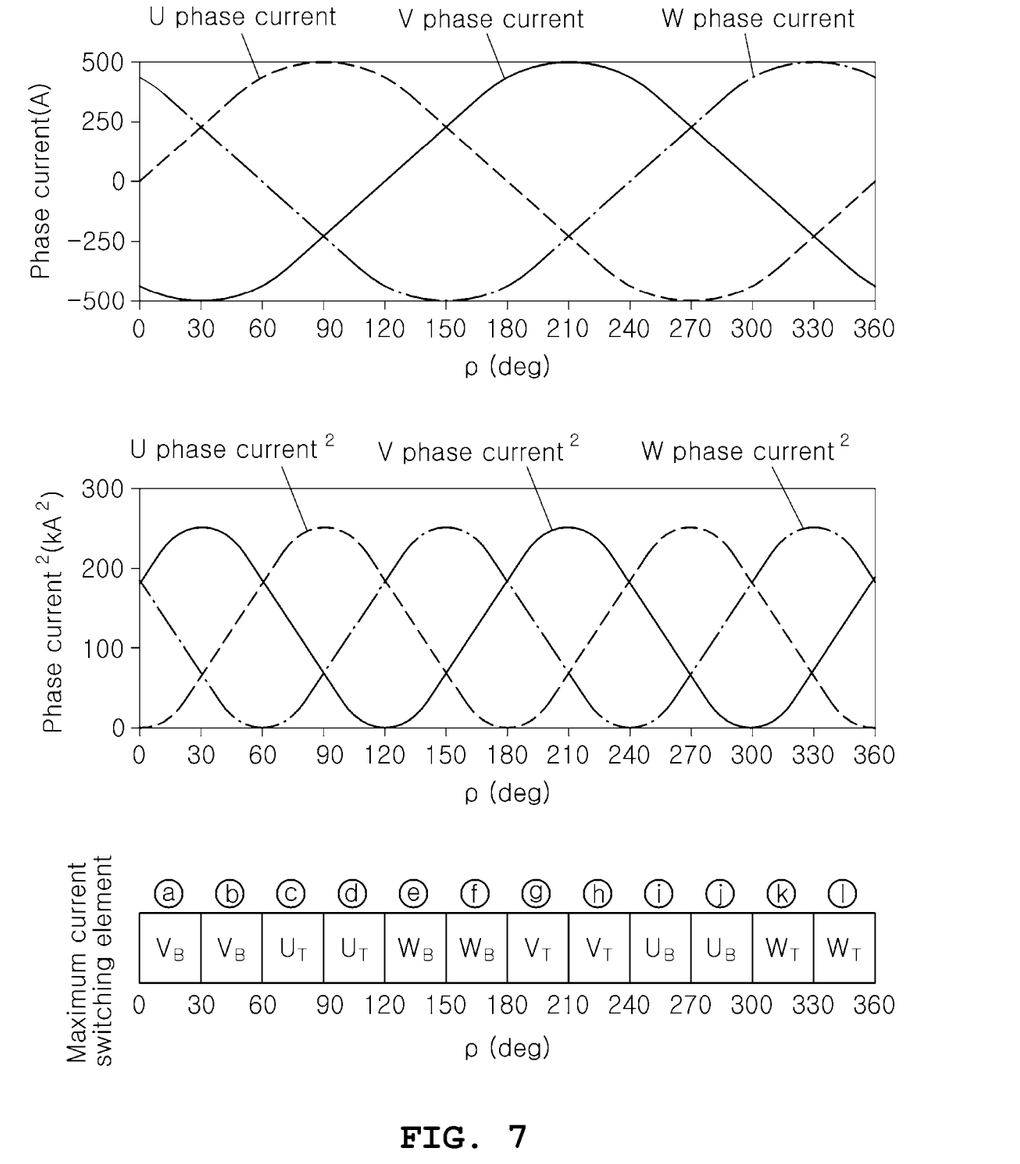
FIG. 7 is a diagram illustrating operation of a heat dispersion controller of the motor drive system capable of suppressing heat generation during a low speed operation according to the embodiment of the present disclosure.

FIG. 7 is a diagram illustrating operation of the heat dispersion controller of the motor drive system capable of suppressing heat generation during a low speed operation according to the embodiment of the present disclosure In the heat dispersion controller 120, the following Equation 4 allowing a rotor angle and a current phase angle to be replaced with one parameter ρ is used to obtain three phase currents having a peak value $Im_x$ and a phase angle $β_x$ as the following Equation 5.

$$ρ = θ + 270 - β_x \quad \text{[Equation 4]}$$

$$I_U = Im_x \cdot \sinρ \quad \text{[Equation 5]}$$

$$I_V = Im_x \cdot \sin\left(ρ + \frac{2}{3}π\right)$$

$$I_W = Im_x \cdot \sin\left(ρ - \frac{2}{3}π\right)$$

When the three phase currents obtained by the Equation 5 are illustrated on the ρ axis, waveforms can be derived as shown at a topmost part of FIG. 7.

When the squares of the currents, which are a factor directly affecting a resistance loss, are illustrated, waveforms can be derived as shown in the middle of FIG. 7. The switching elements having the largest square value of the currents according to a position of ρ by using the waveforms are illustrated in the lowest part of FIG. 7. "$U_T$, $U_B$, $V_T$, $V_B$, $W_T$, $W_B$" illustrated in FIG. 7 refer to switching elements in the inverter 20 illustrated in FIG. 1.

For example, when ρ exists in ⓒ section, a switching element through which the maximum current flows is '$U_T$'. In this case, when ρ is moved to ⓑ section to change an operating point of the motor 30 so as to have a current command having a larger phase angle of current although the torque is the same, the switching element through which the maximum current flows may become '$V_B$'. For another example, when ρ exists in ⓓ section, the switching element through which the maximum current flows is '$U_T$'. In this case, when ρ is moved to ⓔ section to change the operating point of the motor 30 so as to have a current command having a smaller phase angle of current although the torque is the same, the switching element through which the maximum current flows may become '$W_B$'.

Of course, when ρ exists in ⓒ section, the switching element through which the maximum current flows may be changed to '$W_B$' by moving ρ to ⓔ section by further reducing the phase angle. In this case, since the magnitude of the current phase angle is desired to be changed to value larger than 30, the magnitude of the phase current may dramatically increase compared to the current command determined by using MTPA, which is disadvantageous in terms of loss thereof.

Accordingly, in the technique of changing the switching element on which currents are concentrated by changing the phase angle, a section to which ρ corresponding to a present operating point belongs in 12 sections in which ρ is divided at a 30 degree interval is changed to a section, of adjacent sections, in which the switching element on which currents are concentrated is changed.

Figure 8:
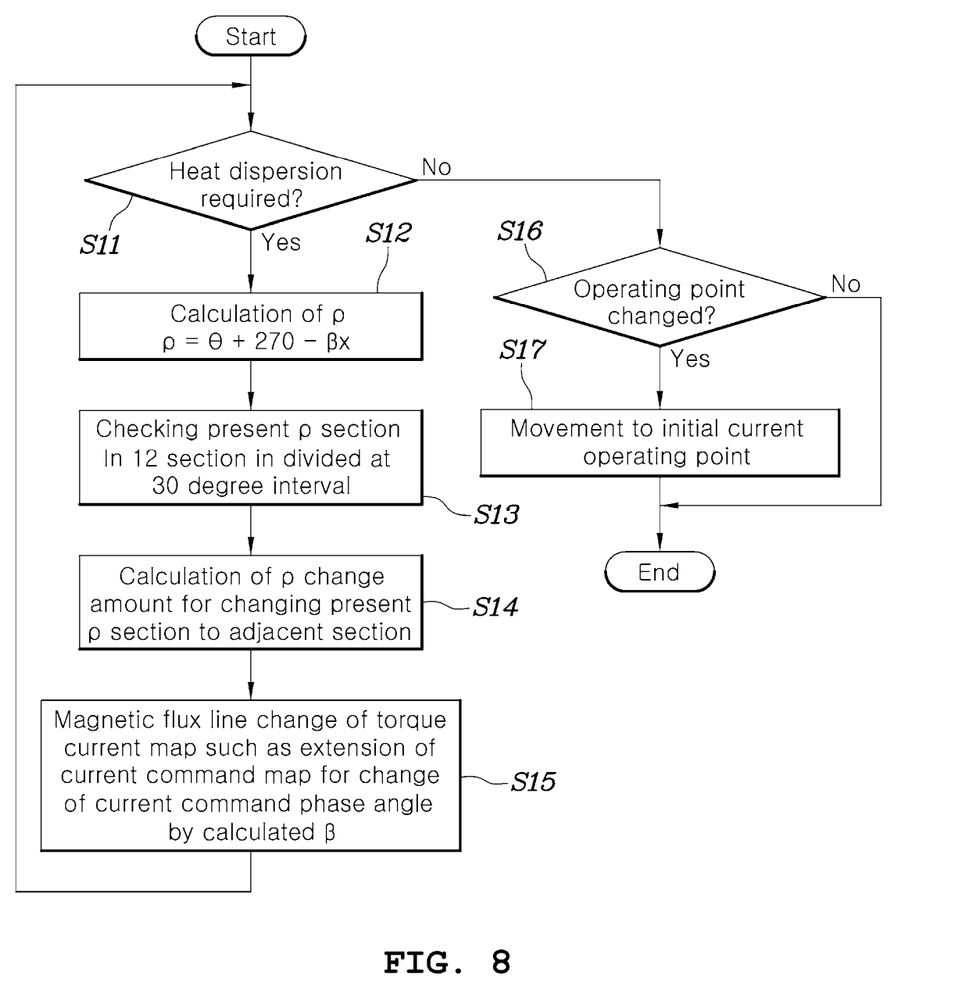
FIGS. 8 to 10 are flowcharts illustrating a motor drive method capable of suppressing heat generation during a low speed operation according to various embodiments of the present disclosure.
Figure 9:
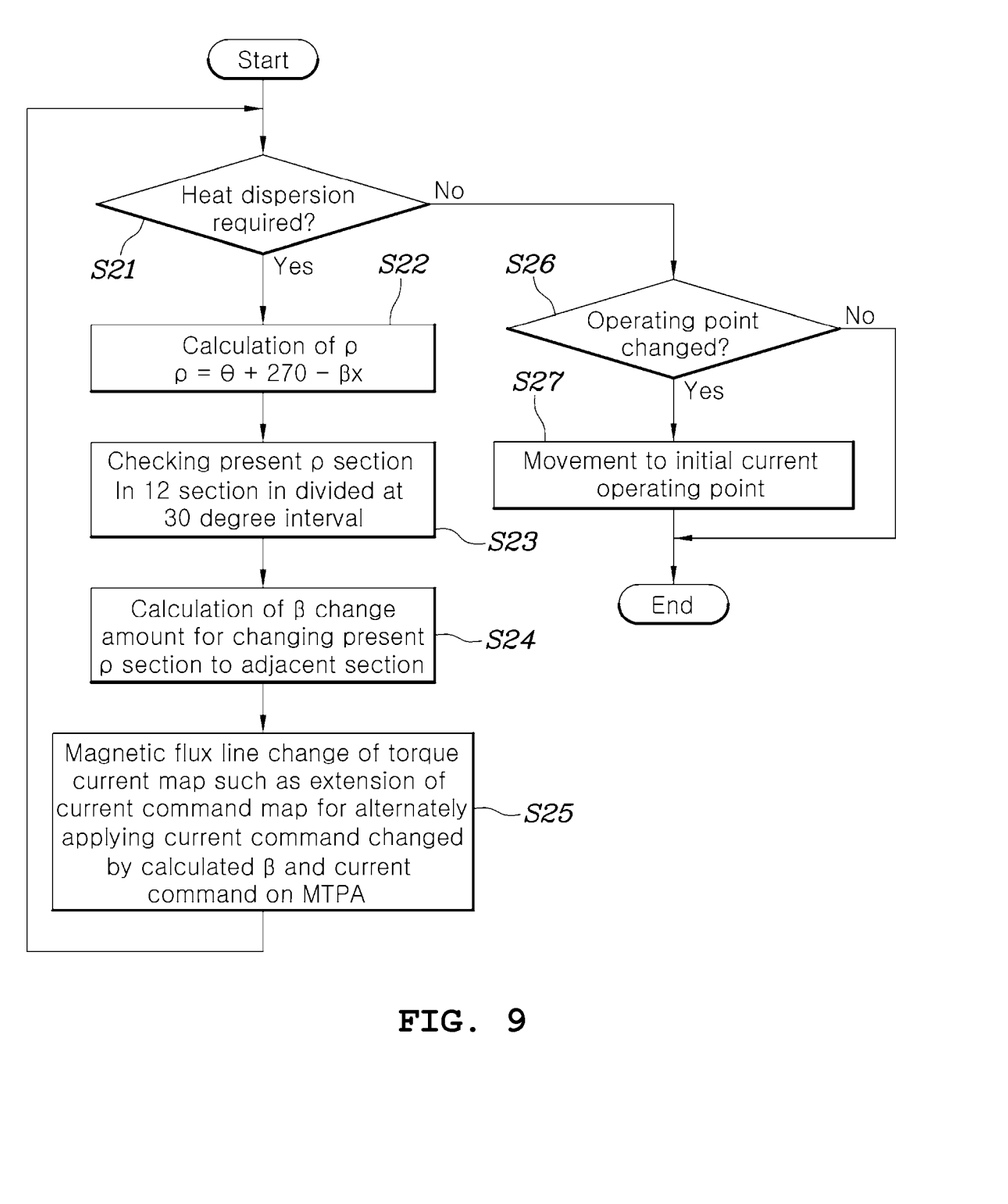
Figure 10:
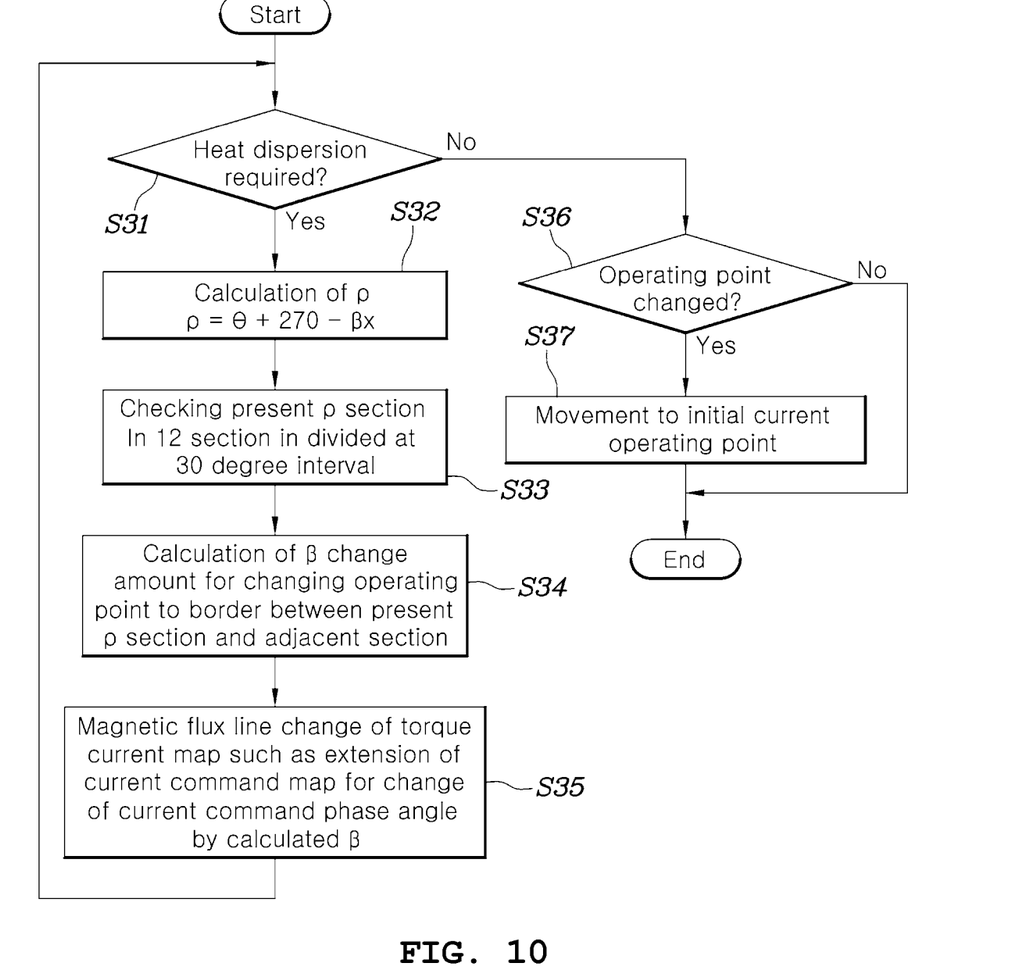

FIGS. 8 to 10 are flowcharts illustrating the motor drive method capable of suppressing heat generation during a low speed operation according to the various embodiments of the present disclosure.

The motor drive method illustrated in FIGS. 8 to 10 can be embodied by the motor drive system, which is described above.

First, referring to FIG. 8, in the motor drive method capable of suppressing heat generation during a low speed operation according to the embodiment of the present disclosure, first, the controller 100 determines whether the heat dispersion control is desired at S11. Determining whether the heat dispersion control is desired may be embodied in a method of determining whether temperature of each of the switching elements sensed by a temperature sensor (not shown) installed in the inverter 20 is higher than a preset reference temperature. The reference temperature, which is a temperature for determining whether the switching element is overheated, may be preset.

At S11, when it is determined that the heat dispersion control is desired, the heat dispersion controller 120 of the controller 100 calculates a new variable ρ at S12 by applying a rotor position angle θ detected by the rotor position sensor 40 and the phase angle β corresponding to the current command (Id*, Iq*) output by a present current command generation part 110 to Equation 4, which is described above, and checks a section to which ρ belongs as illustrated in FIG. 7 at S13.

Next, the heat dispersion controller 120 calculates a phase angle change amount for changing the section to which ρ belongs to the adjacent section in which the switching element through which maximum current flows is changeable at S14, and determines an equal magnetic flux line corresponding to a phase angle change amount calculated by using the current command map as illustrated in FIG. 6 at S15.

At S15, the current command generation part 110 can control the motor 30 by determining an intersection point of an equal torque line corresponding to a present torque command in the current command map and an equal magnetic flux line determined by the heat dispersion controller 120 as the operating point of a new motor and by outputting a torque command corresponding to the determined operating point.

Meanwhile, when it is determined that the heat dispersion control is not necessary at S11, it is determined whether an operating point has been changed before to control the motor at S16, and when the operating point is changed, the current command can be generated by changing the operating point such that the motor 30 is operated at the initial operating point, that is, at the operating point determined by using the MTPA line at S17.

Next, referring to FIG. 9, in a motor drive method capable of suppressing heat generation during a low speed operation according to another embodiment of the present disclosure, as the embodiment of FIG. 8 described above, when it is determined that the heat dispersion control is desired at S21, the heat dispersion controller 120 calculates a new variable ρ at S22 by applying a rotor position angle θ detected by a rotor position sensor 40 and a phase angle β corresponding to a current command (Id*, Iq*) output by a present current command generation part 110 to Equation 4, which is described above, and checks a section to which ρ belongs as illustrated in FIG. 7 at S23.

Next, as the embodiment of FIG. 8, the heat dispersion controller 120 can calculate a phase angle change amount for changing a section to which p belongs to an adjacent section in which a switching element through which maximum current flows is changeable at S24.

Next, the heat dispersion controller 120 determines an equal magnetic flux line corresponding to the phase angle change amount calculated by using the current command map as illustrated in FIG. 6, and the current command generation part 110 can control the motor 30 by determining an intersection point of an equal torque line corresponding to a present torque command in the current command map and an equal magnetic flux line determined by the heat dispersion controller 120 as the operating point of a new motor, and alternately outputting a torque command corresponding to the determined operating point and a torque command determined by using a present MTPA line at S25. Such a control method allows currents to be alternately applied to two switching elements, and accordingly, the heat dispersion effect is further improved compared to having heat being concentrated on one specific switching element, and thus temperature rise can be restrained.

Next, referring to FIG. 10, in a motor drive method capable of suppressing heat generation during a low speed operation according to still another embodiment of the present disclosure, as the embodiment of FIGS. 8 and 9, which is described above, when it is determined that the heat dispersion control is desired at S31, the heat dispersion controller 120 calculates a new variable ρ at S32 by applying a rotor position angle θ detected by the rotor position sensor 40 and a phase angle β corresponding to the current command (Id*, Iq*) output by a present current command generation part 110 to Equation 4, which is described above, and checks a section to which ρ belongs as illustrated in FIG. 7 at S33.

Next, the heat dispersion controller 120 can calculate a phase angle change amount to change a section to which ρ belongs to a border between the present section to which ρ belongs and an adjacent section in which a switching element through which maximum current flows is changeable at S34.

Next, the heat dispersion controller 120 determines an equal magnetic flux line corresponding to the phase angle change amount calculated at S34 by using the current command map as illustrated in FIG. 6, and the current command generation part 110 can control the motor 30 by determining an intersection point of an equal magnetic flux line determined by the heat dispersion controller 120 as an operating point of a new motor and outputting a torque command corresponding to the determined operating point at S35. In such a control method, a position corresponding to a border of a section in which the square of maximum currents different from each other flows in sections divided as in the bottom-most drawing of FIG. 7 is determined as an operating point of the motor 30. For example, when an operating point is changed to a border between (b) section and (c) section, the border corresponds to an operating point at which the same current flows in switching elements $V_B$, $U_T$. Accordingly, the heat dispersion effect can be achieved by preventing currents from being concentrated on one switching element.

Although exemplary forms of the present disclosure have been described for illustrative purposes, those skilled in the art will appreciate that various modifications, additions and substitutions are possible, without departing from the scope and spirit of the present disclosure.

What is claimed is:

1. A motor drive system capable of suppressing heat generation during a low speed operation, the motor drive system comprising:
   an inverter including a plurality of switching elements to convert direct current power to alternating current power having a plurality of phases;
   a motor driven with the alternating current power converted in the inverter; and
   a controller configured to determine an operating point of the motor based on a torque command of the motor and generate a d-axis current command and a q-axis current command corresponding to the operating point,
   wherein when a switching element of the plurality of switching elements is overheated, the controller is configured to change the d-axis current command and the q-axis current command by changing the operating point to a different operating point corresponding to a torque of the same magnitude as the torque command, and
   wherein when the switching element is overheated, the controller is configured to:
   convert three phase currents based on the d-axis current command and the q-axis current command by using the following Equations:

$$\rho = \theta + 270 - \beta_x,$$
$$I_U = Im_x \cdot \sin\rho,$$
$$I_V = Im_{xx} \cdot \sin\left(\rho + \frac{2}{3}\pi\right), \text{ and}$$
$$I_W = Im_x \cdot \sin\left(\rho - \frac{2}{3}\pi\right),$$

where, $Im_x$ is a peak value of each of the three phase currents, and $\beta_X$ is a phase angle of the d-axis current command and the q-axis current command, and
change the operating point of the motor by searching for the phase angle of the d-axis current command and the q-axis current command so as to change an angle section to which a variable ρ belongs in a plurality of angle sections divided at preset intervals.

2. The motor drive system of claim 1, wherein a switching element to which a square of the three phase currents is maximally applied is designated in the plurality of angle sections, and
the controller is configured to change an angle section to which the variable p belongs to an adjacent angle section in which the switching element to which the maximum square of the three phase currents is applied is changeable.

3. The motor drive system of claim 2, wherein the controller is configured to:
calculate the phase angle of the d-axis current command and the q-axis current command so as to change the angle section to which the variable ρ belongs to the adjacent angle section in which the switching element to which the maximum square of the three phase currents is applied is changeable, and
change the operating point of the motor to a point at which an equal torque line of the operating point at which the d-axis current command and the q-axis current command are determined by selecting an equal magnetic flux line corresponding to the phase angle and the selected equal magnetic flux line intersect with each other.

4. The motor drive system of claim 2, wherein the controller is configured to:
calculate the phase angle of the d-axis current command and the q-axis current command so as to change the angle section to which the variable ρ belongs to the adjacent angle section in which the switching element to which the maximum square of the three phase currents is applied is changeable, and alternately apply an operating point of the motor corresponding to a point at which an equal torque line of an operating point at which the d-axis current command and the q-axis current command are determined by selecting an equal magnetic flux line corresponding to the phase angle and the selected equal magnetic flux line intersect with each other and a prior operating point of the motor to the operating point of the motor.

5. The motor drive system of claim 2, wherein the controller is configured to:

calculate the phase angle of the d-axis current command and the q-axis current command so as to change the angle section to which the variable ρ belongs to a border between the adjacent angle section in which the switching element to which the maximum square of the three phase currents is applied is changeable and the angle section to which a present variable ρ belongs, and change the operating point of the motor to a point at which an equal torque line of the operating point at which the d-axis current command and the q-axis current command are determined by selecting an equal magnetic flux line corresponding to the phase angle and the selected equal magnetic flux line intersect with each other.

6. A motor drive method for a motor using a motor drive system capable of suppressing heat generation during a low speed operation, the motor drive method comprising:

determining, by a controller, whether a switching element is overheated; and changing, by the controller, a d-axis current command and a q-axis current command by changing an operating point to a different operating point corresponding to a torque of the same magnitude as a torque command when it is determined that the switching element is overheated, wherein changing the d-axis current command and the q-axis current command includes:

converting three phase currents based on the d-axis current command and the q-axis current command by using the following Equations:

$$\rho = \theta + 270 - \beta_x,$$
$$I_U = Im_x \cdot \sin\rho,$$
$$I_V = Im_x \cdot \sin\left(\rho + \frac{2}{3}\pi\right), \text{ and}$$
$$I_W = Im_x \cdot \sin\left(\rho - \frac{2}{3}\pi\right),$$

where, $Im_x$ is a peak value of the three phase currents, and $\beta x$ is a phase angle of the d-axis current command and the q-axis current command;

checking an angle to which a variable ρ belongs in a plurality of angle sections divided at preset intervals; and changing the operating point of the motor by searching a phase angle of the d-axis current command and the q-axis current command for changing an angle section to which the variable ρ belongs.

7. The motor drive method of claim 6, wherein in determining whether the switching element is overheated, the controller compares a sensed temperature value of the switching element with a preset reference value and determines that the switching element is overheated when the sensed temperature value is larger than the preset reference value.

8. The motor drive method of claim 6, wherein a switching element to which a square of the three phase currents is maximally applied is designated in the plurality of angle sections, and wherein in changing the operating point, the angle section to which the variable p belongs is changed to an adjacent angle section in which the switching element to which a maximum square of the three phase currents is applied is changeable.

9. The motor drive method of claim 8, wherein changing the operating point includes:

calculating the phase angle of the d-axis current command and the q-axis current command so as to change the angle section to which the variable ρ belongs to the adjacent angle section in which the switching element to which the maximum square of the three phase currents is applied is changeable; and changing the operating point of the motor to a point at which an equal torque line of the operating point at which the d-axis current command and the q-axis current command are determined by selecting an equal magnetic flux line corresponding to the phase angle calculated in the calculating and the selected equal magnetic flux line intersect with each other.

10. The motor drive method of claim 8, wherein changing the operating point includes:

calculating the phase angle of the d-axis current command and the q-axis current command so as to change the angle section to which the variable ρ belongs to the adjacent angle section in which the switching element to which the maximum square of the three phase currents is applied is changeable; and alternately applying an operating point of the motor corresponding to a point at which an equal torque line of the operating point at which the d-axis current command and the q-axis current command are determined by selecting an equal magnetic flux line corresponding to the phase angle calculated in the calculating and the selected equal magnetic flux line intersect with each other and a prior operating point of the motor to the operating point of the motor.

11. The motor drive method of claim 8, wherein changing the operating point includes:

calculating the phase angle of the d-axis current command and the q-axis current command so as to change the angle section to which the variable ρ belongs to a border between the adjacent angle section in which the switching element to which the maximum square of the three phase currents is applied is changeable and an angle section to which a present variable ρ belongs; and changing an operating point of the motor to a point at which an equal torque line of the operating point at which the d-axis current command and the q-axis current command are determined by selecting an equal magnetic flux line corresponding to the phase angle calculated in the calculating and the selected equal magnetic flux line intersect with each other.

* * * * *